(12) United States Patent
Tsuchida et al.

(10) Patent No.: US 8,741,089 B2
(45) Date of Patent: Jun. 3, 2014

(54) METHOD FOR FABRICATING DISPLAY DEVICE

(75) Inventors: Kenichiro Tsuchida, Osaka (JP); Tomoo Takatani, Osaka (JP); Hiroshi Fukushima, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 13/640,350

(22) PCT Filed: May 13, 2011

(86) PCT No.: PCT/JP2011/002682
§ 371 (c)(1),
(2), (4) Date: Oct. 10, 2012

(87) PCT Pub. No.: WO2012/001864
PCT Pub. Date: Jan. 5, 2012

(65) Prior Publication Data
US 2013/0068379 A1  Mar. 21, 2013

(30) Foreign Application Priority Data
Jun. 28, 2010 (JP) ................. 2010-146362

(51) Int. Cl.
| | |
|---|---|
| *B29C 65/02* | (2006.01) |
| *B32B 37/00* | (2006.01) |
| *B32B 38/10* | (2006.01) |
| *C09J 5/06* | (2006.01) |
| *B29C 65/50* | (2006.01) |
| *B29C 63/00* | (2006.01) |
| *C08J 5/12* | (2006.01) |

(52) U.S. Cl.
USPC .............. 156/247; 156/307.3; 156/307.7; 156/308.2; 156/311; 156/711

(58) Field of Classification Search
USPC ............ 156/247, 307.1, 307.3, 307.7, 308.2, 156/311, 325, 701, 711; 349/96, 143
See application file for complete search history.

(56) References Cited

U.S. PATENT DOCUMENTS 5,161,049 A    11/1992  Tanno et al.
6,656,309 B1 * 12/2003  Parker et al. .............. 156/249
(Continued)

FOREIGN PATENT DOCUMENTS

JP    04-000410 A    1/1992
JP    2002-123179 A    4/2002
(Continued)

OTHER PUBLICATIONS

Machine English Translation of JP 2010-286737 (Nov. 1, 2013).*
(Continued)

*Primary Examiner* — Sing P Chan
(74) *Attorney, Agent, or Firm* — Keating & Bennett, LLP

(57) ABSTRACT

A method for fabricating a display device 1 includes a first step of attaching a display panel and a first substrate member to each other with a first adhesive sandwiched between the display panel and the first substrate member, and a second step of attaching a second substrate member to the first substrate member on a surface of the first substrate member opposite to the display panel with a second adhesive sandwiched between the first and second substrate members, where the second step is carried out subsequently to the first step. The second adhesive used in the second step has a glass transition point higher than a glass transition point of the first adhesive.

5 Claims, 3 Drawing Sheets

(56) References Cited

U.S. PATENT DOCUMENTS

2004/0218245 A1    11/2004  Kean et al.
2012/0062823 A1*   3/2012   Takatani et al. .................. 349/96

FOREIGN PATENT DOCUMENTS

| JP | 2003-223114 | A |   | 8/2003  |          |
|----|-------------|---|---|---------|----------|
| JP | 2004-287440 | A |   | 10/2004 |          |
| JP | 2007-102565 | A |   | 4/2007  |          |
| JP | 2009-151225 | A |   | 7/2009  |          |
| JP | 2010286737  | A | * | 12/2010 | G02B 5/30 |
| WO | WO 2010140393 | A1 | * | 12/2010 | G02B 5/30 |

OTHER PUBLICATIONS

English Abstract of JP 2010-286737 (Nov. 1, 2013).*
Official Communication issued in International Patent Application No. PCT/JP2011/002682, mailed on Jun. 28, 2011.

* cited by examiner

METHOD FOR FABRICATING DISPLAY DEVICE

TECHNICAL FIELD

The present disclosure relates to methods for fabricating display devices.

BACKGROUND ART

In recent years, thin display devices such as liquid crystal display devices have been widely used in various types of apparatus such as personal computers, cellar phones, PDAs, and game machines. For example, a liquid crystal display device for providing a translucent display includes a liquid crystal display panel and a backlight unit positioned opposite to a viewer of the liquid crystal display panel. Such a display device displays a desired image by selectively allowing illumination light emitted by the backlight unit to pass through the liquid crystal display panel.

Patent Document 1 describes an optical sheet to be provided to a backlight unit. The optical sheet includes a light diffusion member which emits and diffuses light, an optically functional member which controls properties such as direction and luminance distribution of the light, and an adhesive layer which bonds the light diffusion member and the optically functional member together. An air layer is provided between the light diffusion member and the optically functional member, and light passing through the air layer serves as illumination light to be supplied to the liquid crystal display panel.

The adhesive layer is made of an adhesive composition containing flow-preventive micro particles dispersed therein and is configured to have a glass transition point Tg which is greater than −70° C. and less than 0° C. Patent Document 1 also describes that this configuration can bond the light diffusion member and the optically functional member together, preventing the members from coming unstuck and separating from each other and maintaining the air layer.

Meanwhile, it is known to attach, e.g., a touch panel or a parallax barrier panel on a surface closer to a viewer of a liquid crystal display panel (see, for example, Patent Documents 2 and 3). The touch panel or the parallax barrier panel is attached on the display panel with an adhesive sandwiched between the panels.

CITATION LIST

Patent Document

PATENT DOCUMENT 1: Japanese Patent Publication No. 2009-151225
PATENT DOCUMENT 2: Japanese Patent Publication No. 2007-102565
PATENT DOCUMENT 3: Japanese Patent Publication No. 2004-287440

SUMMARY OF THE INVENTION

Technical Problem

It is also possible, for example, to attach a protective substrate on a surface of a touch panel in order to protect the touch panel. Specifically, the touch panel is attached on a surface of a display panel with a first adhesive sandwiched between the touch panel and the display panel, and the protective substrate is attached on a surface of the touch panel opposite to the display panel with a second adhesive sandwiched between the touch panel and the protective panel.

A laminated structure including, for example, the display panel, the touch panel and the protective panel, as described above, can be fabricated by two alternative processes. In a first process, for example, the display panel and the touch panel are attached to each other with the first adhesive sandwiched therebetween, and thereafter, the protective substrate is attached on a surface of the touch panel with the second adhesive sandwiched therebetween. On the other hand, in a second process, for example, the touch panel and the protective panel are attached to each other with the second adhesive sandwiched therebetween, and thereafter, the display panel is attached on a surface of the touch panel with the first adhesive sandwiched therebetween.

When fabricating the laminated structure, however, a failure of attachment may be adversely caused by intrusion of a foreign substance between the display panel and the touch panel or between the touch panel and the protective panel, or by a misalignment of the panels. In such a case, the generally called re-work, in which only a substrate or a panel which has caused the attachment failure is removed and panels or substrates are newly attached together, can reduce waste of components such as display panels and touch panels, thereby enabling reduction of production costs.

However, since the display panel, the touch panel, and the adhesives have a considerably small thickness, removing only a desired substrate or a desired panel involves difficulty, and this difficulty posed a problem in performing the re-work suitably.

It is therefore an object of the present disclosure to enable the re-work to be suitably performed by facilitating removal of a predetermined substrate from another substrate, for example.

Solution to the Problem

To achieve the object, a method for fabricating a display device of the present disclosure includes a first step of attaching a display panel and a first substrate member to each other with a first adhesive sandwiched between the display panel and the first substrate member, and a second step of attaching a second substrate member to the first substrate member on a surface of the first substrate member opposite to the display panel with a second adhesive sandwiched between the first and second substrate members, where the second step is carried out subsequently to the first step, wherein the second adhesive used in the second step has a glass transition point higher than a glass transition point of the first adhesive.

Another method for fabricating a display device of the present disclosure includes a first step of attaching a first substrate member and a second substrate member to each other with a first adhesive sandwiched between the first substrate member and the second substrate member, and a second step of attaching display panel to the first substrate member on a surface of the first substrate member opposite to the second substrate member with a second adhesive sandwiched between the first substrate member and the display panel, where the second step is carried out subsequently to the first step, wherein the second adhesive used in the second step has a glass transition point higher than a glass transition point of the first adhesive.

Advantages of the Invention

According to the present disclosure, when the display device is fabricated by attaching the second substrate member and the display panel to the first substrate member, the glass transition point of the second adhesive used in a second attachment is higher than the glass transition point of the first adhesive used in a first attachment. Consequently, if a failure of attachment occurs in the second attachment after the first attachment is successfully carried out, keeping the first and second adhesives at a temperature between the glass transition points can cure only the second adhesive of the first and second adhesives. Therefore, the second substrate member or the display panel which has been attached in the second attachment can be easily removed from the first substrate member. As a result, the re-work can be suitably carried out by newly attaching a second substrate member or a display panel to the first substrate member.

DESCRIPTION OF EMBODIMENTS

Embodiments of the present disclosure are described below in detail with reference to the drawings. Note that the present disclosure is not limited to the embodiments described below.

First Embodiment

FIGS. 1-5 show a first embodiment of the present disclosure.

Figure 1:
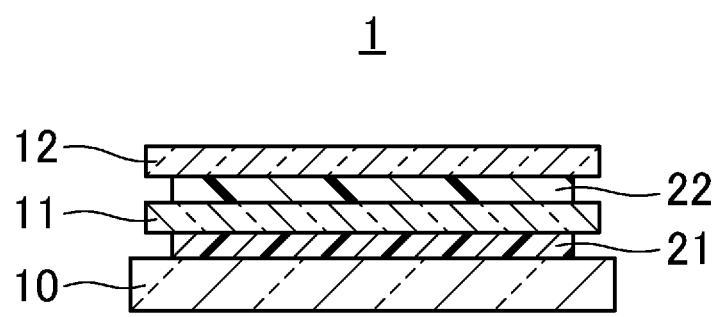
FIG. 1 is a cross-sectional view of a structure of a principal portion of a liquid crystal display device of a first embodiment.
Figure 2:
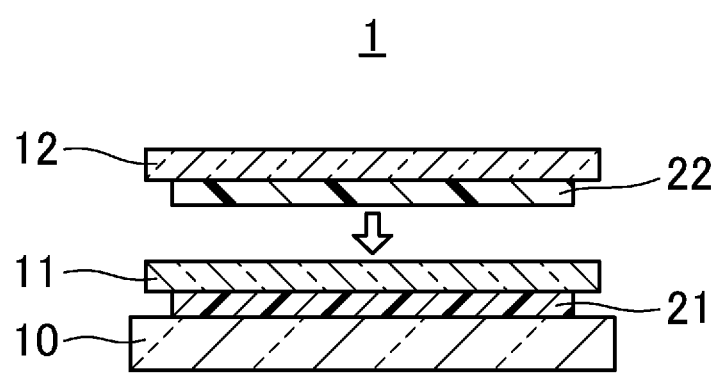
FIG. 2 is a cross-sectional view showing a liquid crystal display panel and a touch panel attached together, and a protective substrate.

FIG. 1 is a cross-sectional view of a structure of a principal portion of a liquid crystal display device 1 of the first embodiment. FIG. 2 is a cross-sectional view showing a liquid crystal display panel 10 and a touch panel 11 attached together, and a protective substrate 12.

Figure 3:
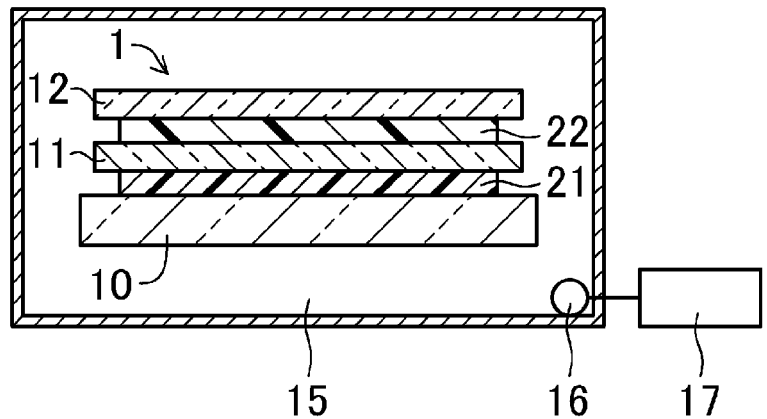
FIG. 3 is a cross-sectional view of the liquid crystal display device placed in a cooling chamber.
Figure 4:
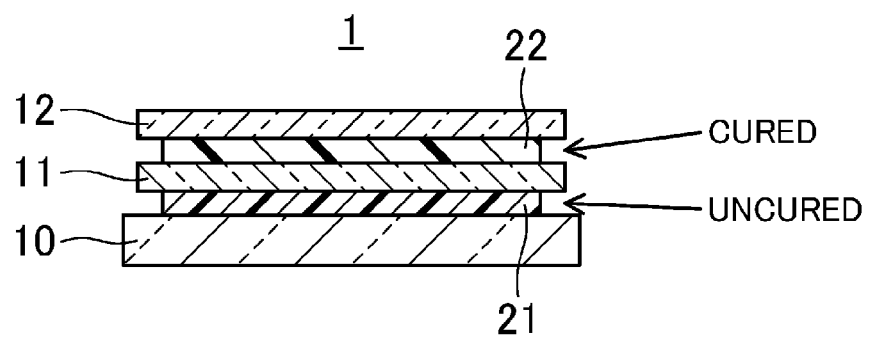
FIG. 4 is a cross-sectional view showing the cooled liquid crystal display device.
Figure 5:
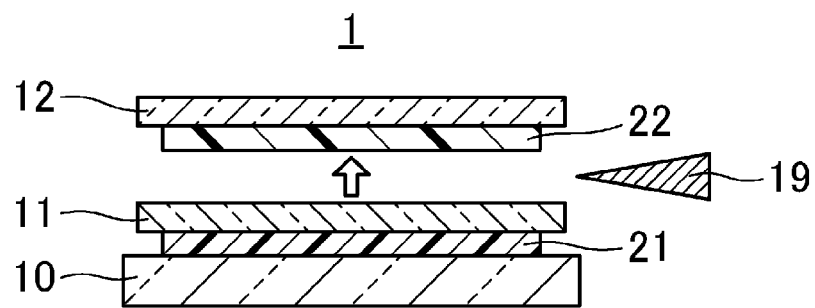
FIG. 5 is a cross-sectional view showing removal of the protective substrate from the touch panel.

FIG. 3 is a cross-sectional view of the liquid crystal display device 1 placed in a cooling chamber 15. FIG. 4 is a cross-sectional view of the cooled liquid crystal display device 1. FIG. 5 is a cross-sectional view showing removal of the protective substrate 12 from the touch panel 11.

In this embodiment, the liquid crystal display device 1 is described as an example of display devices.

The liquid crystal display device 1 includes the liquid crystal display panel 10, the touch panel 11 which is a first substrate member provided opposite to the liquid crystal display panel 10, and the protective substrate 12 which is a second substrate member provided opposite to the touch panel 11.

The liquid crystal display panel 10 and the touch panel 11 are attached to each other with a first adhesive 21 sandwiched therebetween. The touch panel 11 and the protective substrate 12 are attached to each other with a second adhesive 22 sandwiched therebetween.

The liquid crystal display panel 10, of which a detailed illustration is omitted, includes a TFT substrate (not shown) as an active matrix substrate, a counter substrate (not shown) provided opposite to the TFT substrate, and a liquid crystal layer (not shown) provided between the TFT substrate and the counter substrate.

The liquid crystal display panel 10 further includes a display region (not shown) and a non-display region (not shown) in a frame shape surrounding the display region. A plurality of pixels (not shown) are formed and arranged in a matrix on the display region.

The counter substrate includes a transparent substrate (not shown) such as a glass substrate on which a color filter and a common electrode are formed, for example. The TFT substrate includes a transparent substrate (not shown) such as a glass substrate on which a plurality of source lines (not shown) extending in parallel to each other and a plurality of gate lines (not shown) extending perpendicularly to the source lines are formed. Further, a pixel electrode and a thin-film transistor (TFT) connected to the pixel electrode are formed in each of the pixels on the TFT substrate.

Consequently, the liquid crystal display panel 10 is configured to display a desired image by applying a predetermined voltage pixel by pixel between the pixel electrodes and the common electrode.

The touch panel 11 is, e.g., a resistive-layer type touch panel and includes a first transparent substrate (not shown) and a second transparent substrate (not shown) provided opposite to the first transparent substrate.

On the touch panel 11, a picture-frame region (not shown) in a frame shape is formed in peripheral portions of the first and second transparent substrates, and a detection region (not shown) for detecting touch positions is formed inside the picture-frame region.

The second transparent substrate is located at a side where touch operation is performed and made of a flexible resin substrate. For example, a resin such as polyethylene terephthalate (PET) can be used as a material for the resin substrate. On the other hand, the first transparent substrate is made of a glass substrate, for example.

The first and second transparent substrates are attached to each other with a predetermined gap present therebetween by means of an adhesive layer (not shown). On a surface of the first transparent substrate facing the second transparent substrate, a transparent electrode (not shown) made of, e.g., ITO, is uniformly formed over the entire detection region. In a similar manner, on a surface of the second transparent substrate facing the first transparent substrate, a transparent electrode made of, e.g., ITO, is uniformly formed over the entire detection region.

A plurality of spacer dots (not shown) are formed on a surface of the transparent electrode of the first transparent substrate. The spacer dots are made of, e.g., an epoxy resin having insulation properties, and each has a minute dimension smaller than the gap between the substrates in the detection region. The spacer dots are arranged at predetermined intervals.

Resistance of ITO creates a potential gradient in the transparent electrode of the second transparent substrate. A touch to the detection region of the second transparent substrate warps the detection region toward the first transparent substrate, and the transparent electrode of the second transparent substrate comes into contact with the transparent electrode of the first transparent substrate. At this time, the potential of the contact point is detected through the transparent electrode of the first transparent substrate, and consequently, the position of the touch is detected.

The protective substrate 12 is a transparent substrate to protect the touch panel 11, and made of a glass substrate or a transparent resin substrate, for example.

The first adhesive 21 sandwiched between the touch panel 11 and the liquid crystal display panel 10 is made of a resin material such as an acrylate copolymer resin. The glass transition point Tg(1) of the first adhesive 21 is −54° C., for example.

Here, glass transition refers to a phenomenon in which a high polymer converts its state from a glass-like hard one into a rubber-like one when heated. A glass transition point (Tg) refers to a temperature at which glass transition occurs.

The glass transition point (Tg) can be measured by using differential scanning calorimetry (DSC). DSC is a method by which a thermal change which occurs when the temperature of a sample is increased or decreased at a certain speed is quantified as an amount of heat energy.

The second adhesive 22 sandwiched between the touch panel 11 and the protective substrate 12 is made of, in a manner similar to the first adhesive 21, a resin material such as an acrylate copolymer resin. The glass transition point Tg(2) of the second adhesive 22 is, for example, −27° C., which is higher than the glass transition point Tg(1) of the first adhesive 21.

—Fabrication Method—

Next, a fabrication method of the liquid crystal display device 1 will be described.

The liquid crystal display device 1 is fabricated by attaching the liquid crystal display panel 10, the touch panel 11, and the protective substrate 12, each of which has been formed in advance, together by means of the first adhesive 21 or the second adhesive 22 sandwiched between the panels.

In a first step, the liquid crystal display panel 10 and the touch panel 11 are attached to each other with the first adhesive 21 sandwiched therebetween. This first step is carried out in a first working place. If a failure of attachment is caused in this step by intrusion of a foreign substance between the liquid crystal display panel 10 and the touch panel 11 or by a misalignment of the panels, the first adhesive 21 is cooled at a temperature lower than the glass transition point Tg(1) to be cured. The touch panel 11 is then removed from the liquid crystal display panel 10, and a new touch panel 11 is newly attached to the liquid crystal display panel 10 with a new first adhesive 21 sandwiched between the panels, thereby carrying out a re-work.

Next, in a second step, as shown in FIG. 2, the protective panel 12 is attached to the touch panel 11 on the surface of the touch panel 11 opposite to the liquid crystal display panel 10, with the second adhesive 22 sandwiched between the panels 11 and 12. The second step is carried out in a second working place separate from the first working place. As described above, the second adhesive used in the second step has the glass transition point Tg(2) higher than the glass transition point Tg(1) of the first adhesive.

If a failure occurs (i.e., if intrusion of a foreign substance between the touch panel 11 and the protective panel 12, or a misalignment of the panels 11 and 12 occurs) when attaching the touch panel 11 and the protective panel 12 together in the second step, a third step is carried out.

In the third step, as shown in FIG. 3, a laminated structure made of the liquid crystal display panel 10, the touch panel 11, and the protective panel 12 is placed in the cooling chamber 15, where the laminated structure is cooled. The cooling chamber 15 is equipped with a temperature sensor 16. A temperature controller 17 adjusts a temperature in the cooling chamber 15 to a predetermined temperature, on the basis of a temperature detected by the temperature sensor 16. In this manner, the first adhesive 21 and the second adhesive 22 are cooled at a temperature which is higher than the glass transition point Tg(1) of the first adhesive 21 and lower than the glass transition point Tg(2) of the second adhesive 22. As a result, as shown in FIG. 4, the first adhesive 21 remains uncured whereas the second adhesive 22 is cured.

In a subsequent fourth step, as shown in FIG. 5, the protective panel 12 is removed from the touch panel 11 after the third step. In this step, since the first adhesive 21 remains uncured whereas the second adhesive 22 is cured, a removal jig 19 in a wedge shape can easily remove the second adhesive 22 and the protective panel 12 from the touch panel 11 along the interface between the second adhesive 22 and the touch panel 11.

Thereafter, the second step is carried out again to attach a new protective panel 12 to the touch panel 11 with a new second adhesive 22 sandwiched between the panels 11 and 12. In this manner, a re-work is easily carried out and the liquid crystal display device 1 is fabricated.

Advantages of First Embodiment

According to the first embodiment, when the liquid crystal display device 1 is fabricated by the method including a first attachment in which the touch panel 11 and the liquid crystal display panel 10 are attached together and a subsequent second attachment in which the touch panel 11 and the protective panel 12 are attached together, the glass transition point Tg(2) of the second adhesive 22 used in the second attachment is higher than the glass transition point Tg(1) of the first adhesive 21 used in the first attachment. Consequently, if a failure of attachment occurs in the second attachment (the second step) after the first attachment (the first step) is successfully carried out, keeping the first and second adhesives 21 and 22 at a temperature between the glass transition points Tg(1) and Tg(2) can cure only the second adhesive 22 of the first and second adhesives 21 and 22. Therefore, the protective substrate 12 which has been attached in the second attachment can be easily removed from the touch panel 11. As a result, the re-work can be suitably carried out by newly attaching a protective panel 12 to the touch panel 11.

Second Embodiment

Figure 6:
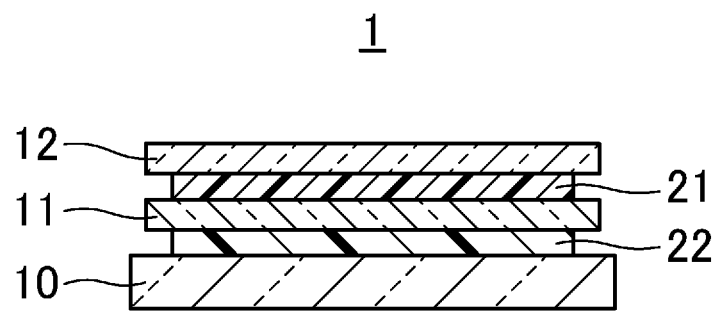
FIG. 6 is a cross-sectional view of a structure of a principal portion of a liquid crystal display device of a second embodiment.
Figure 7:
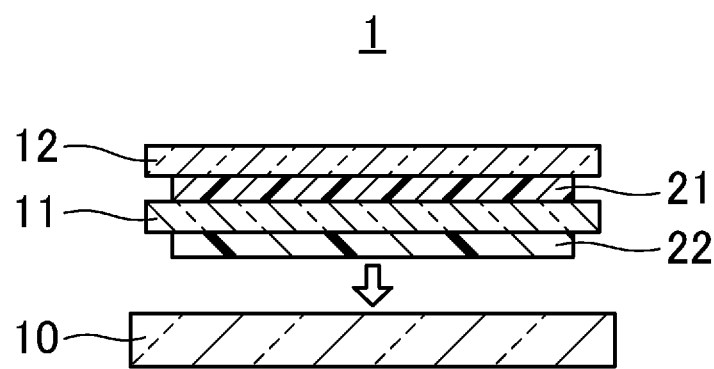
FIG. 7 is a cross-sectional view showing a protective panel and a touch panel attached together, and a liquid crystal display panel.

FIGS. 6 and 7 show a second embodiment of the present disclosure.

FIG. 6 is a cross-sectional view of a structure of a principal portion of a liquid crystal display device 1 of the second embodiment. FIG. 7 is a cross-sectional view showing a protective panel 12 and a touch panel 11 attached together, and a liquid crystal display panel 10. Note that, in the embodiments described below, the same components as those in FIGS. 1-5 are denoted by the same reference numerals, and detailed description thereof will not be repeated.

In the first embodiment, the first adhesive 21 is sandwiched between the liquid crystal display panel 10 and the touch panel 11 whereas the second adhesive 22 is sandwiched between the touch panel 11 and the protective panel 12. On the other hand, in this second embodiment, the second adhesive 22 is sandwiched between the liquid crystal display panel 10 and the touch panel 11 whereas the first adhesive 21 is sandwiched between the touch panel 11 and the protective panel 12, as shown in FIG. 6.

In order to fabricate a liquid crystal display device 1 of this embodiment, in a first step, the touch panel 11 and the protective panel 12 are attached to each other with the first adhesive 21 sandwiched therebetween. The first step is carried out in a first working space. If a failure of attachment is caused in this step by intrusion of a foreign substance between the touch panel 11 and the protective panel 12 or by a misalignment of the panels, the first adhesive 21 is cooled at a temperature lower than the glass transition point Tg(1) to be cured. The protective panel 12 is then removed from the touch panel 11, and a new protective panel 12 is newly attached to the touch panel 11 with a new first adhesive 21 sandwiched between the panels, thereby carrying out a re-work.

Next, in a second step, as shown in FIG. 7, the liquid crystal display panel 10 is attached to the touch panel 11 on the surface of the touch panel 11 opposite to the protective panel 12, with the second adhesive 22 sandwiched between the panels 11 and 10. The second step is carried out in a second working place separate from the first working place. As described above, the second adhesive used in the second step has the glass transition point Tg(2) higher than the glass transition point Tg(1) of the first adhesive.

If a failure occurs (i.e., if intrusion of a foreign substance between the touch panel 11 and the liquid crystal display panel 10, or a misalignment of the panels 11 and 10 occurs) when attaching the touch panel 11 and the liquid crystal display panel 10 together in the second step, a third step is carried out.

In the third step, in a manner similar to the first embodiment, a laminated structure made of the liquid crystal display panel 10, the touch panel 11, and the protective panel 12 is placed in a cooling chamber 15, where the laminated structure is cooled. The first adhesive 21 and the second adhesive 22 are then cooled at a temperature which is higher than the glass transition point Tg(1) of the first adhesive 21 and lower than the glass transition point Tg(2) of the second adhesive 22. As a result, the first adhesive 21 remains uncured whereas the second adhesive 22 is cured.

In a subsequent fourth step, the liquid crystal display panel 10 is removed from the touch panel 11. In this step, since the first adhesive 21 remains uncured whereas the second adhesive 22 is cured, a removal jig 19 in a wedge shape can easily remove the second adhesive 22, the touch panel 11, the first adhesive 21, and the protective panel 12 from the liquid crystal display panel 10 along the interface between the second adhesive 22 and the liquid crystal display panel 10.

Thereafter, the first and second steps are carried out again to attach the touch panel 11, to which the protective panel 12 is attached with the first adhesive 21 sandwiched between the panels 11 and 12, to a liquid crystal display panel 10 with the second adhesive 22 sandwiched between the panels 11 and 10. In this manner, re-work is easily carried out and the liquid crystal display device 1 is fabricated.

Advantages of Second Embodiment

According to the second embodiment, when the liquid crystal display device 1 is fabricated by the method including a first attachment in which the touch panel 11 and the protective panel 12 are attached together and a subsequent second attachment in which the touch panel 11 and the liquid crystal display panel 10 are attached together, the glass transition point Tg(2) of the second adhesive 22 used in the second attachment is higher than the glass transition point Tg(1) of the first adhesive 21 used in the first attachment. Consequently, if a failure of attachment occurs in the second attachment (the second step) after the first attachment (the first step) is successfully carried out, keeping the first and second adhesives 21 and 22 at a temperature between the glass transition points Tg(1) and Tg(2) can cure only the second adhesive 22 of the first and second adhesives 21 and 22. Therefore, the liquid crystal display panel 10 which has been attached in the second attachment can be easily removed from the touch panel 11. As a result, the re-work can be appropriately carried out by newly attaching the touch panel 11 to a liquid crystal display panel 10.

Other Embodiments

Although the touch panel 11 and the protective panel 12 are described respectively as the first substrate member and the second substrate member in the first and second embodiments, the present disclosure is not limited to these embodiments. Other optical members can be used as the first and second substrate members. For example, a parallax barrier panel, instead of the touch panel 11, can be applied as the first substrate member.

The parallax barrier panel is a panel with an engineering function which separates a first image and a second image displayed on a display panel from each other such that the first image will be viewable in a first viewable region whereas the second image will be viewable in a second viewable region.

Although the liquid crystal display panel 10 is described as an example of display panels in the first and second embodiments, the present disclosure is not limited to these embodiments. For example, other types of display panels such as an organic EL display panel can also be applied to the present disclosure.

INDUSTRIAL APPLICABILITY

As described above, the present disclosure is useful for a method for fabricating a display device.

DESCRIPTION OF REFERENCE CHARACTERS

1 Liquid crystal display device
10 Liquid crystal display panel
11 Touch panel (First substrate member)
12 Protective substrate (Second substrate member)
17 Temperature controller
19 Removal jig
21 First adhesive
22 Second adhesive

The invention claimed is:

1. A method for fabricating a display device, the method comprising:
   a first step of attaching a display panel and a first substrate member to each other with a first adhesive sandwiched between the display panel and the first substrate member; and
   a second step of attaching a second substrate member to the first substrate member on a surface of the first substrate member opposite to the display panel with a second adhesive sandwiched between the first and second substrate members, the second step being carried out subsequently to the first step, wherein
      the second adhesive used in the second step has a glass transition point higher than a glass transition point of the first adhesive,
   the method further comprising:
      a third step of cooling the first and second adhesives at a temperature higher than the glass transition point of the first adhesive and lower than the glass transition point of the second adhesive, the third step being carried out if a failure of attachment of the first substrate member and the second substrate member occurs in the second step; and a fourth step of removing the second substrate member from the first substrate member, the fourth step being carried out after the third step, and the second step is carried out again after the fourth step.

2. The method of claim 1, wherein
the first substrate member is a touch panel or a parallax barrier panel.

3. The method of claim 1, wherein
the second substrate member is a protective substrate.

4. The method of claim 1, wherein
the display panel is a liquid crystal display panel.

5. A method for fabricating a display device, the method comprising:

a first step of attaching a first substrate member and a second substrate member to each other with a first adhesive sandwiched between the first substrate member and the second substrate member; and a second step of attaching a display panel to the first substrate member on a surface of the first substrate member opposite to the second substrate member with a second adhesive sandwiched between the first substrate member and the display panel, the second step being carried out subsequently to the first step, wherein the second adhesive used in the second step has a glass transition point higher than a glass transition point of the first adhesive, the method further comprising:

a third step of cooling the first and second adhesives at a temperature higher than the glass transition point of the first adhesive and lower than the glass transition point of the second adhesive, the third step being carried out if a failure of attachment of the first substrate member and the display panel occurs in the second step; and a fourth step of removing the display panel from the first substrate member, the fourth step being carried out after the third step, and the second step is carried out after the fourth step.

* * * * *